United States Patent [19]

Bordet et al.

[11] 4,125,682
[45] Nov. 14, 1978

[54] SODIUM-SULPHUR ELECTRIC CELL

[75] Inventors: Philippe Bordet, La Ville du Bois; Alain Le Méhauté, Gif sur Yvette, both of France

[73] Assignee: Compagnie General d'Electricite, Paris, France

[21] Appl. No.: 841,080

[22] Filed: Oct. 11, 1977

[30] Foreign Application Priority Data

Oct. 22, 1976 [FR] France .................. 76 31890

[51] Int. Cl.² .................. H01M 10/39
[52] U.S. Cl. .................. 429/104; 429/218
[58] Field of Search .................. 429/104, 102–103, 429/31, 94, 163, 191, 193, 218

[56] References Cited

U.S. PATENT DOCUMENTS

| 3,841,912 | 10/1974 | Kagawa et al. | 429/104 |
| 4,027,075 | 5/1977 | Nakabayashi et al. | 429/104 |
| 4,029,858 | 6/1977 | Evans et al. | 429/104 |
| 4,048,394 | 9/1977 | Ludwig | 429/104 |

Primary Examiner—Anthony Skapars
Attorney, Agent, or Firm—Sughrue, Rothwell, Mion, Zinn and Macpeak

[57] ABSTRACT

The invention relates to a sodium-sulphur electric cell. It comprises a cathode tank containing sulphur, a solid electrolyte tube being disposed in this tank and containing sodium, said cathode tank being lined with a continuous strip of felt or fabric, more particularly of graphite wound in a spiral one of whose ends is in contact with the wall of the cathode tank, at least one of the turns of said spiral having a plurality of holes, the other end of the strip being in contact with either the electrolyte tube or a conductive grid surrounding the tube and disposed at a predetermined distance from that tube. The invention is implemented in electric vehicles.

4 Claims, 6 Drawing Figures

SODIUM-SULPHUR ELECTRIC CELL

FIELD OF THE INVENTION

The present invention relates to electric cells having a beta alkaline alumina electrolyte.

BACKGROUND OF THE INVENTION

It is known that in these cells, the anode reagent is constituted by an alkaline metal, generally sodium, which must be liquid at the operation temperature. The cathode reagent is constituted generally by sulphur and the sodium salts of this substance, but can also be constituted by phosphorus, selenium and the alkaline salts of these substances. In the case where the reagent materials are sulphur and sodium, the electrochemical reaction leads to the reversible formation of sodium polysulphides whose sodium contents increase during discharge. As for the electrolyte, which separates the cathode reagents from the anode reagents, it must be solid at the operation temperature, i.e. at about 300° C., impermeable to the alkaline ions which form in the anode compartment and permeable to electrons. It is generally constituted by sodium beta alumina, i.e. a compound comprising about five to nine molecules of alumina for one molecule of sodium oxide. It generally has the form of a tube closed at its bottom part, containing the anode reagent and immersed in the cathode reagent, the latter reagent being contained in a metal cathode tank and impregnating a graphite felt formed by washers surrounding said tube. The electrolyte tube is held by a support connected in a fluid-tight manner to this anode reagent tank.

Generally, said support is in the form of a plate or disc made of alpha alumina. This disc comprises a central bore in which the beta sodium alumina is set.

In such cells, the discharge process leads to the transformation of the sulphur into sodium polysulphides in the sequence set forth hereinbelow:

During recharging, the opposite process occurs. However, it is observed that it is practically impossible in conventional cells to effect the transformation

and consequently to effect complete recharging.

Such a disadvantage results from the fact that during recharging a layer of sulphur is permanently deposited on the electrolyte tube, and acts as a migration barrier with respect to the sodium ions and thus opposes the complete regeneration of the elementary sulphur.

Further, it is observed that the electrochemical reaction within the sulphur is distributed in a not very homogenous manner, this resulting in charging and a recharging which are defective, by a reduction in the capacity and by detrimental ageing phenomena.

To avoid these drawbacks, it has been proposed elsewhere either to displace the sulphur layer in the vapour phase from the electrolyte tube towards the positive current collector, or else to make use of an additive such as a sulphide or arsenic, or else to modulate the conductivity of the body of molten sulphur.

Nonetheless such solutions have not adequately mitigated the said drawbacks. The present applicant has therefore elaborated a new solid electrolyte cell structure suitable for eliminating such disadvantages and for allowing consequently a charging and recharging of the said cell which are practically complete, while avoiding ageing phenomena.

SUMMARY OF THE INVENTION

The invention provides an electric cell comprising:

A cathode tank containing a cathode reagent which is liquid at the operation temperature and chosen from the group formed by sulphur, phosphorus, selenium and the alkaline salts of these substances.

At least one solid electrolyte tube closed at its lower end containing an anode reagent which is liquid at operation temperature constituted by an alkaline metal is disposed in the cathode tank so as to be immersed in the cathode reagent, the walls of this tube being made of beta alkaline alumina.

At insulating ceramic support is provided for holding the electrolyte tube in said cathode tank, this support and this tube being connected together by a glass part.

An anode tank containing a stock of said anode reagent is disposed above the cathode tank, so that the electrolyte tube opens at its upper part into this anode tank. The support separates the open ends of the anode tank and of the cathode tank and the cathode tank is lined with a means for cathode collection of the current generated. The means for cathode collection comprises a continuous strip, wound in a spiral, one of whose ends is in contact with the wall of the cathode tank, at least one of the turns of the spiral has a plurality of holes through its whole thickness, and the strip is made of felt, or fabric, or carbon paper, or graphite paper.

Other characteristics and advantages of the invention become apparent from the following description given purely by way of an illustrative example having no limiting character with reference to the accompanying drawings, in which:

DESCRIPTION OF THE PREFERRED EMBODIMENTS

The cell is in the form of a cylinder of revolution, but it must be understood that it can be in any other form.

Figure 1:
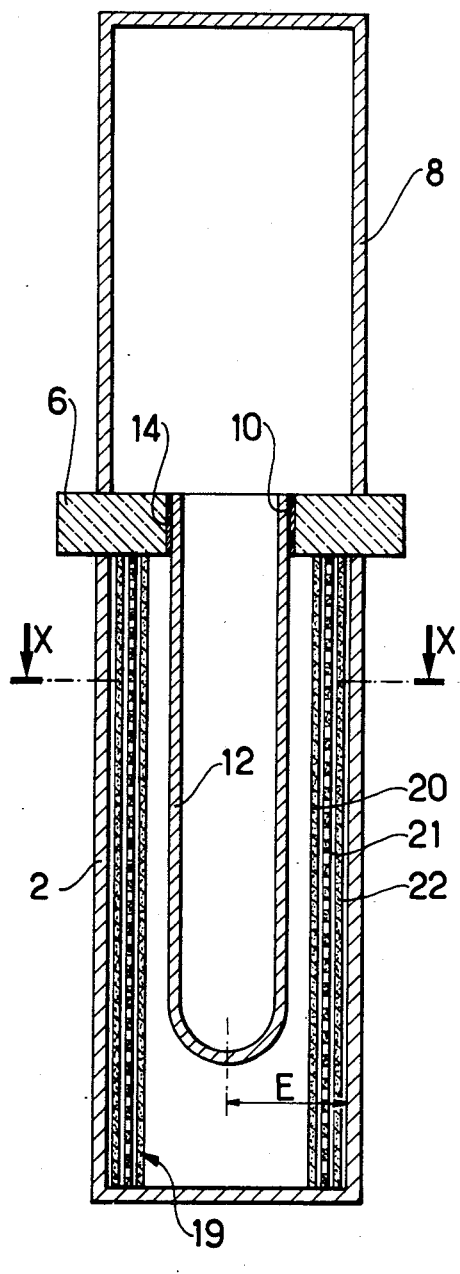
FIG. 1 is a longitudinal cross-section of an electrochemical cell according to a first embodiment of the invention.
Figure 2:
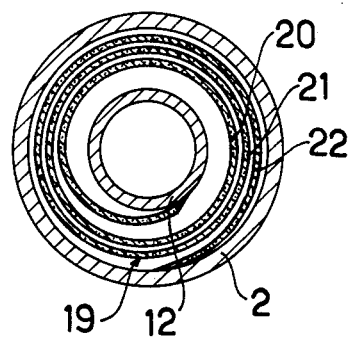
FIG. 2 is a cross-section along the axis XX in FIG. 1.

The cell in a first embodiment according to FIGS. 1 and 2 comprises a cylindrical cathode tank 2 which is conductive, whose wall is sealed at its top part to the inner face of an alpha alumina plate 6 which is horizontal and circular.

A cylindrical anode tank 8 which is also conductive and has substantially the same diameter as the cathode tank 2 is sealed in the same way by its bottom part to the top surface of the plate 6 which acts as a support for it.

It contains an active stock of anode reagent consisting of liquid sodium.

The plate 6 has at its centre a cylindrical bore 10 with a vertical axis. The open top end of an electrolyte tube 12 which is closed at its bottom end, which is constituted by beta sodium alumina and which contains the anode reagent, is engaged in this bore 10.

The top edge of the tube 12 is in the plane of the top surface of the plate 6.

A connection glass 14 is interposed between the outer wall of the top of the tube 12 and the wall of the bore 10 in the plate 6 so as to make the connection fluid-tight.

According to the invention, a continuous strip of felt or fabric or carbon paper or graphite paper 19 is disposed between the wall of said cathode tank 2 and the tube 12, the strip being wound in a spiral and impregnated with sulphur.

Such a spiral which acts as a current collector comprises, by way of a non-limiting example, three turns referenced successively 20, 21 and 22, going from the tube 12 to the wall of the tank 2 which are therefore respectively in contact with the ends of the spiral.

Figure 5:
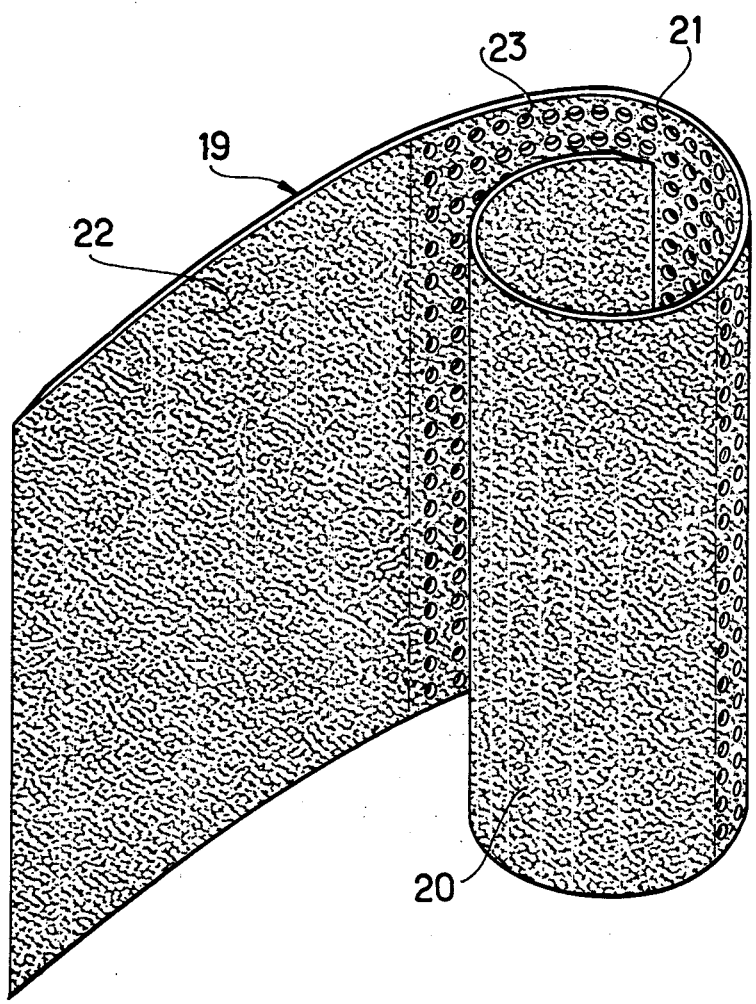
FIG. 5 is a developped view of the graphite felt lining the cathode tank of a cell embodying the invention.

FIG. 5 shows such a spiral of felt supposed to be developped.

As shown in FIG. 5, only the second turn 21 of the spiral has a plurality of holes 23 right through its thickness. Thus two zones 20 and 22 having high conductivity and a zone 21 having medium conductivity have been formed.

In this way, the electrochemical reaction is better distributed in the cathode tank 2, this causing better charging and recharging and ageing and avoiding reductions in capacity.

Of course, the number of turns of the spiral is a function in particular of the thickness of the strip and of the distance between the tube 12 and the wall of the tank 2.

Likewise, the number of turns of the spiral such as 21 comprising holes, the number and diameter of the holes 23 are predetermined to obtain in a given cell an optimum conductivity which ensures satisfactory operation of said cell both in charging and during discharge.

Figure 3:
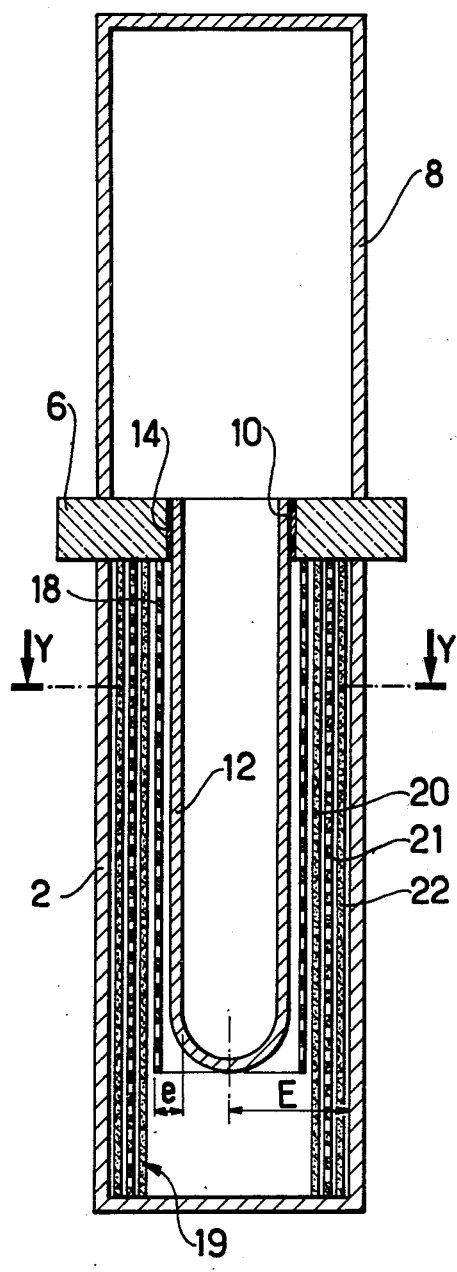
FIG. 3 is a longitudinal cross-section of an electric cell according to a second embodiment of the invention.
Figure 4:
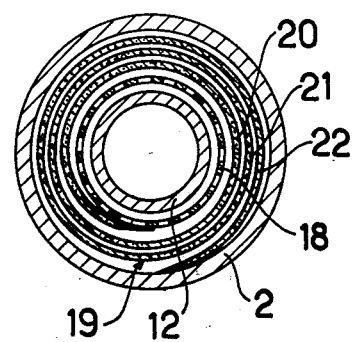
FIG. 4 is a cross-section along the axis YY of FIG. 2.

The cell in a second embodiment according to FIGS. 3 and 4 comprises the same elements as in the embodiment illustrated and described with reference to FIGS. 1 and 2.

However, in this second embodiment, a cylindrical grid 18 which is electronically conductive is fixed on the lower surface of the plate 6 by one of its ends, the other end of this grid being disposed substantially at the level of the hemi-spherical bottom of the tube 12. Said grid 18 made for example of nickel is disposed at a distance $e$ from the tube 12. This distance $e$ is such that its ratio at the radius E of the tank 12 will be such as $$0.05 < (e/E) < 0.5$$

Preferably, the value of this ratio is 0.2.

The continuous strip such as illustrated in FIG. 5 is also wound in a spiral so that one of its ends will be in contact with the wall of the tank 2, while the other is in contact with the grid 18.

Due to the presence of the grid 18, the sulphur during recharging is not deposited on the electrolyte tube 12, but on the contrary it is deposited in small quantities on the grid 18.

However, taking into account the fact that the sulphur is in contact with polysulphides on either side of the grid, such a deposit is thermodynamically unstable and cannot act as a migration barrier.

It follows that $Na_2S_5$ can thus be transformed into sulphur virtually totally, also contributing to ensuring a complete recharging of the cell.

A concrete example will be given hereinbelow of an embodiment of a cell according to the invention.

The tube has a diameter of 10 mm, a height of 40 mm, the grid being disposed at 1 mm from said tube and at 12 mm from the wall of the tank 2.

A graphite felt is used which is 1 mm thick and is disposed between the grid 18 and the tank 2 in a spiral of four turns whose lengths are 56, 60, 69 and 75 mm succesively. 50% of the surface area of the first and the third turns has holes which have a diameter of substantially 2 mm.

Figure 6:
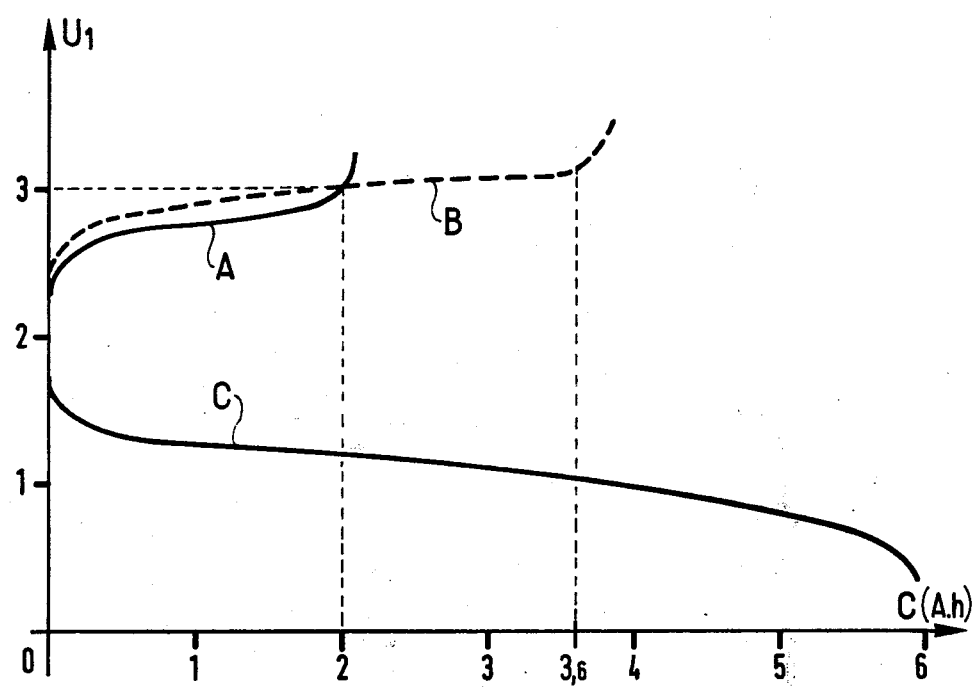
FIG. 6 is a graph showing the advantages of a cell embodying the invention.

In FIG. 6 the cell voltage V is shown as a function of its capacity C in amp-hours. More particularly curves A and B show these parameters during charging respectively for a conventional cell (curve A) and for a cell embodying the invention (curve B), while curve C shows the discharge performance of a cell embodying the invention at a current of 200 mA/cm$^2$. It can be seen from the curves A and B that a cell embodying the invention has substantially twice the capacity of a conventional cell.

It must be understood that the invention is in no way limited to the embodiments described and illustrated which have therefore been given by way of example. In particular, without going beyond the scope of the invention, details can be modified, some dispositions can be changed or some means can be replaced by equivalent means.

It must be understood that the man in the art is capable of producing cells such as described but having any other shape, without thereby going beyond the scope of the invention.

What we claim is:

1. An electric cell comprising:
   a cathode tank containing a cathode reagent which is liquid at the operation temperature and chosen from the group consisting of sulphur, phosphorus, selenium and alkaline salts of these substances;
   at least one solid electrolyte tube closed at its lower end containing an anode reagent which is liquid at operation temperature consisting of an alkaline metal and disposed in said cathode tank so as to be immersed in said cathode reagent, the walls of this tube being made of beta alkaline alumina;
   an insulating ceramic support for holding said electrolyte tube in said cathode tank, a glass part connecting said support and said tube together;
   an anode tank containing a stock of said anode reagent and disposed above said cathode tank, said electrolyte tube opening at its upper part into said anode tank, said support separating the open ends of said anode tank and of said cathode tank, and said cathode tank being lined with a means for cathode collection of the current generated, the improvement wherein said collection means comprises a continuous strip wound in a spiral, one end of said strip being in contact with the wall of said cathode tank, at least one of the turns of said spiral having a plurality of holes through its whole thickness.

2. A cell according to claim 1, wherein the other end of said continuous spiral wound strip is in contact with said solid electrolyte tube.

3. A cell according to claim 1, wherein said cell further comprises a tubular grid interposed between said strip and said electrolyte tube and the other end of said continuous spiral wound strip bearing against said grid and said tubular grid having one end fixed to said ceramic support and the other end terminating within said tank substantially at the level of the bottom of said electrolyte tube.

4. A cell according to claim 3, wherein said grid is disposed at a predetermined distance from said electrolyte tube, this distance being such that the value of its ratio at half the transversal dimension of said cathode tank lies between 0.05 and 0.5.

* * * * *